(12) United States Patent
Gitschel

(10) Patent No.: US 8,393,558 B2
(45) Date of Patent: Mar. 12, 2013

(54) MECHANIZED SEPARATION AND RECOVERY SYSTEM FOR SOLID WASTE

(75) Inventor: George Gitschel, Redwood City, CA (US)

(73) Assignee: Organic Energy Corporation, Sugar Land, TX (US)

( * ) Notice: Subject to any disclaimer, the term of this patent is extended or adjusted under 35 U.S.C. 154(b) by 33 days.

(21) Appl. No.: 12/897,996

(22) Filed: Oct. 5, 2010

(65) Prior Publication Data

US 2012/0037733 A1  Feb. 16, 2012

Related U.S. Application Data

(60) Provisional application No. 61/291,177, filed on Dec. 30, 2009.

(51) Int. Cl.
*B02C 23/14* (2006.01)

(52) U.S. Cl. ........ 241/19; 241/20; 241/24.14; 241/79.1; 241/DIG. 38

(58) Field of Classification Search .......... 209/3.1, 209/930; 241/24.13, 19, 20, 79.1, 79, DIG. 38, 241/24.14
See application file for complete search history.

(56) References Cited

U.S. PATENT DOCUMENTS

| | | | |
|---|---|---|---|
| 3,524,594 A * | 8/1970 | Anderson et al. | 53/428 |
| 4,264,352 A * | 4/1981 | Houser | 71/9 |
| 4,874,134 A * | 10/1989 | Wiens | 241/19 |
| 5,100,066 A * | 3/1992 | Frei | 241/21 |
| 5,184,780 A * | 2/1993 | Wiens | 241/19 |
| 5,465,847 A | 11/1995 | Gilmore | |
| 5,649,785 A | 7/1997 | Djerf et al. | |
| 6,024,226 A | 2/2000 | Olivier | |
| 6,117,671 A * | 9/2000 | Yilmaz | 435/262 |
| 6,136,590 A * | 10/2000 | Kruse | 435/262 |
| 6,168,642 B1 | 1/2001 | Valkanas et al. | |
| 6,379,527 B1 | 4/2002 | Vogt et al. | |
| 6,911,149 B2 | 6/2005 | Hansen et al. | |
| 7,290,669 B1 | 11/2007 | Hansen et al. | |
| 7,431,229 B2 | 10/2008 | Gali | |
| 7,452,467 B2 | 11/2008 | Hansen et al. | |
| 7,615,155 B1 | 11/2009 | Hansen et al. | |
| 2002/0184816 A1 | 12/2002 | Philipson | |
| 2008/0020456 A1 | 1/2008 | Choate et al. | |
| 2008/0169231 A1 | 7/2008 | Hansen et al. | |
| 2008/0236042 A1 | 10/2008 | Summerlin | |
| 2010/0201026 A1 | 8/2010 | Stephen et al. | |

FOREIGN PATENT DOCUMENTS

| | | |
|---|---|---|
| JP | 2003/001298 | 1/2003 |
| KR | 10-1999-0003753 | 1/1999 |
| KR | 10/0517663 | 9/2005 |
| KR | 10-2006-0059919 | 6/2006 |
| KR | 10-0665251 | 1/2007 |

* cited by examiner

*Primary Examiner* — Mark Rosenbaum
(74) *Attorney, Agent, or Firm* — Workman Nydegger

(57) ABSTRACT

Methods and systems for separating a mixed waste into a wet organic fraction, a dry organic fraction, and an inorganic fraction are achieved by (i) comminuting the mixed solid waste, (ii) fractionating the comminuted stream by size to produce two or more particle-sized waste streams, and (iii) processing one or more of the particle-sized waste streams using density separation to produce an intermediate wastes stream, and (iv) recovering a homogenous product (e.g., a recyclable material or an organic fuel) from the intermediate waste stream.

20 Claims, 9 Drawing Sheets

MECHANIZED SEPARATION AND RECOVERY SYSTEM FOR SOLID WASTE

CROSS-REFERENCE TO RELATED APPLICATIONS

This Application claims the benefit of U.S. Provisional Patent Application No. 61/291,177, titled "Mechanized Wet and Dry Organics Separation and Recovery System For Municipal Solid Waste," filed Dec. 30, 2009, which is hereby incorporated herein by reference in its entirety.

BACKGROUND OF THE INVENTION

1. The Field of the Invention

The present invention relates to systems and methods adapted for use in waste recycling and conversion. More specifically, the present invention relates to the recycling and conversion of solid waste derived, for example, from domestic and commercial refuse.

2. The Relevant Technology

Commercial, industrial, and residential consumers generate large amounts of throw-away and waste products (i.e., municipal solid waste) that need to be handled and disposed of in an environmentally satisfactory manner. Disposal of municipal solid waste (hereinafter "MSW") has traditionally presented a number of problems.

MSW is typically disposed of by landfilling and/or incineration. The waste products in landfills are typically either raw garbage or incinerator ash. These methods of waste product disposed contaminate the soil, water and air. Environmental restrictions as well as land usage demands for housing have reduced the number of sites available for landfills.

Incineration (i.e., the mass burning of waste products) is rapidly becoming a non-viable alternative in heavily populated areas. Public outcry over the air pollution associated with burning garbage has halted nearly all new incinerator construction.

In response to these waste disposal problems, governments and the public have demanded that, wherever possible, recycling systems should be employed both to conserve material resources and to reduce pollution problems. Efforts have been made to recover valuable resources such as glass, plastic, paper, aluminum, and ferrous and non-ferrous metals from waste materials. For example, households in many cities are asked to sort their garbage into recyclables (e.g., paper, plastic containers, metal containers and glass containers) and non-recyclables. However, rates of non-compliance and mis-compliance are high. That is, some customers fail to sort their waste or they sort incorrectly, which either shunts recoverable materials into the waste stream or contaminates the recyclable stream with waste materials. Non-compliance and mis-compliance reduce the efficiency of and increase the costs associated with operating a recycling system that is designed to processed pre-sorted waste.

In contrast, some recycling systems attempt to dispense with the problems associated with pre-sorting by attempting to recover recyclable materials from mixed waste. However, many of these systems are fraught with the tendency to be highly labor intensive to operate, while offering relatively low recovery rates of recyclables. Furthermore, these types of recovery facilities or programs still do not recover much of the energy rich wet and dry organic materials, which are mostly landfilled as residue.

Many recycling systems configured to work with pre-sorted waste or mixed waste are designed to recover specific materials and/or form specific products. The components of these systems are arranged and designed to recover certain individual fractions such as combustible organic materials, aluminum, ferrous metals, glass, plastic, and miscellaneous bulky inorganic materials. Efficient resource recovery depends in large part upon separating the maximum amount of desirable material from the refuse using relatively few separating components and minimizing the percentage of unwanted materials in the individual fractions.

Nevertheless, the energy balance of many recycling systems is sub-par or, in some cases, negative. For example, many recycling systems tend to misdirect recoverable materials, which reduces the efficiency of downstream processes and wastes much of the valuable energy and/or materials that may otherwise have been recaptured from the recovered waste. In other cases, the processes of recovering, transporting, and recycling the recyclable materials are so inefficient that they consume more energy than could be saved by simply landfilling the garbage and making new products from raw materials.

BRIEF SUMMARY OF THE INVENTION

Example embodiments of the present invention relate to methods and systems for separating solid waste materials. More particularly, embodiments of the present invention relate to methods and systems for processing of mixed solid waste such as MSW into a wet organic fraction, a dry organic fraction, and an inorganic fraction. Efficient separation and recovery is achieved by (i) comminuting the mixed solid waste, (ii) fractionating the comminuted stream by size to produce two or more particle-sized waste streams, (iii) processing one or more of the particle-sized waste streams using density separation to produce an intermediate waste stream, and (iv) recovering a one or more products from the intermediate waste stream. The steps of comminution, size separation, and density separation allows efficient separation and recovery of wet organics, dry organics, and inorganic material from highly variable and highly diverse solid waste streams.

The foregoing processing steps generate intermediate waste streams that are more easily and efficiently sorted using automated sorting equipment. For example, metals can be pulled from an intermediate waste stream because the sizes of the different materials are relatively close and/or because materials of concentrations of same-type materials increases in downstream processes. The approach used in the methods and systems of the present invention often avoids the common situation that occurs in prior art systems where, for example, a large piece of one material (e.g., a large piece of cardboard) covers a small piece of a different material (e.g., copper) and hinders proper separation and recovery. The systems and method of the invention can recover large percentages of materials that exist in low or high concentration concentrations in mixed waste streams. This allows the economical recovery of recyclable materials that were previously cost prohibitive to recover using traditional techniques.

In various embodiments of the invention, the separated wet organics, dry organics, and/or inorganic products can be separately processed to produce valuable products. For example, the wet organic fuel product can be digested to produce biogas and a compost material or dried and utilized as fuel. The dry organic fuel product can be used to produce energy in various thermal conversion processes and/or be used as a carbon fuel substitute. Recyclable materials including glass, ferrous metals, aluminum, non-ferrous metals such as brass, copper, stainless steel, other non-ferrous metals, and construction materials such as rock, stone, soil, etc. can be recovered from the inorganic fraction while the remaining inorganic debris or residue can be landfilled. Recyclable materials including cardboard and various rigid plastics such as PETE and HDPE can be recovered from the dry organic stream.

In one embodiment, a method for separating solid waste is described. The method includes providing a solid waste stream that includes wet organic material, dry organic material, and inorganic debris and comminuting (e.g., grinding or shredding) the solid waste to produce a comminuted waste having a first size distribution. The comminuted solid waste is fractionated by size to produce an under fraction enriched in wet organic material and an over fraction enriched in dry organic material. The over fraction and/or under fraction are further separated to produce an intermediate waste stream from which wet organic products, dry organic products, and/or inorganic products may be recovered. The products may be homogenous products, which are therefore valuable as a recyclable (e.g., homogeneous metals or plastics) or as a usable product (e.g. a dry organic fuel).

Recovery of the product from the intermediate waste stream may be accomplished by simply diverting a product to a bin (e.g., conveying a wet organic product or a dry organic fuel to a storage facility) or it may include the use of a single stream sorting apparatus. The use of comminution, size separation, and density separation can prepare intermediate waste streams suitable for being sorted using equipment configured for single stream waste processing. For example, where a metal is recovered, the separation apparatus may be a magnetic separation unit such as a drum magnet, a cross-belt magnet, a head pulley magnet, etc.), to recover ferrous metal fractions; an eddy current separation unit to recover a non-ferrous metal fraction; and/or a Camera Optical Sorting Machine(s) and/or metal detector and/or other suitable device to recover copper, brass and/or stainless steel non-ferrous metal or a ferrous and non-ferrous metal. In some embodiments, undesired products can be pulled from the intermediate stream using a sorting apparatus to produce the desired product. For example, polyvinyl chloride (PVC) may be removed from a dry organic stream and/or a recyclable plastic stream can be recovered from a dry organic stream using a Near Infrared Optical Sorting Machine and/or camera optical sorter or other suitable device.

The methods and systems of the invention provide the ability to produce multiple intermediate waste streams from highly variable mixed waste, which allows valuable recyclables and fuel products to be economically recovered and used. Moreover, the system may be used on high volume waste streams such as MSW.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Introduction and Definitions

Municipal Solid Waste ("MSW") (i.e., trash or garbage) is a type of waste material that includes predominantly household waste with sometimes the addition of commercial wastes collected by a municipality or a contractor hired by a municipality or by commercial businesses within a given area. They are in either solid or semisolid form and generally exclude industrial hazardous wastes.

MSW contains a number of components that have energy value, if properly separated, segregated and processed. For example, MSW may contain large amounts of organic waste materials (e.g., food and kitchen waste, green waste (i.e., yard clippings, plants, vegetation, branches, lawn, etc.), paper, textiles, rubber, plastics and wood), recyclable materials (e.g., cardboard and certain paper products, glass, ferrous metals, aluminum and other non-ferrous metals, and certain plastics), and inorganic wastes (e.g., concrete, dirt, rocks, debris). Rather than lumping together essentially all MSW classes and either landfilling or incinerating it, it is preferable to separate any and all valuable or usable waste fractions and recover either the raw materials or the energy content therefrom and landfill only those components that are truly classified as refuse, which have no commercial or energy value.

In the present disclosure, a number of comminuting and/or size fractionation steps are described with respect to methods and systems for the separation of solid waste. Typically each of these steps has an associated size cut-off. Persons having skill in the art will appreciate that fractionated materials typically exhibit a distribution of particles. The distribution will often include an insignificant number of particles above or below the cut-off. As used herein, an upper cut-off number (e.g., 16" or less, 12" or less, 8" or less, the upper range of an 8" to 2" over fraction) generally means that about 90% of the particles in the fraction (i.e., the distribution) have a size of less than the cut-off number, while about 10% of the particles in the fraction will be larger than the upper cut-off size. As used herein, a lower cut-off number (e.g., the lower range of an 8" to 2" over fraction) generally means that about 90% of the particles in the fraction have a size of larger than the cut-off number, while about 10% of the particles in the fraction are smaller than the lower cut-off size. In more preferred embodiments, upper cut-off number can include 95%, even more preferably 99% of the of the particles in the fraction and/or the bottom cut can include less than 5%, even more preferably less than 1% of the particles in the fraction.

II. Methods for Separating Municipal Solid Waste

Figure 1:
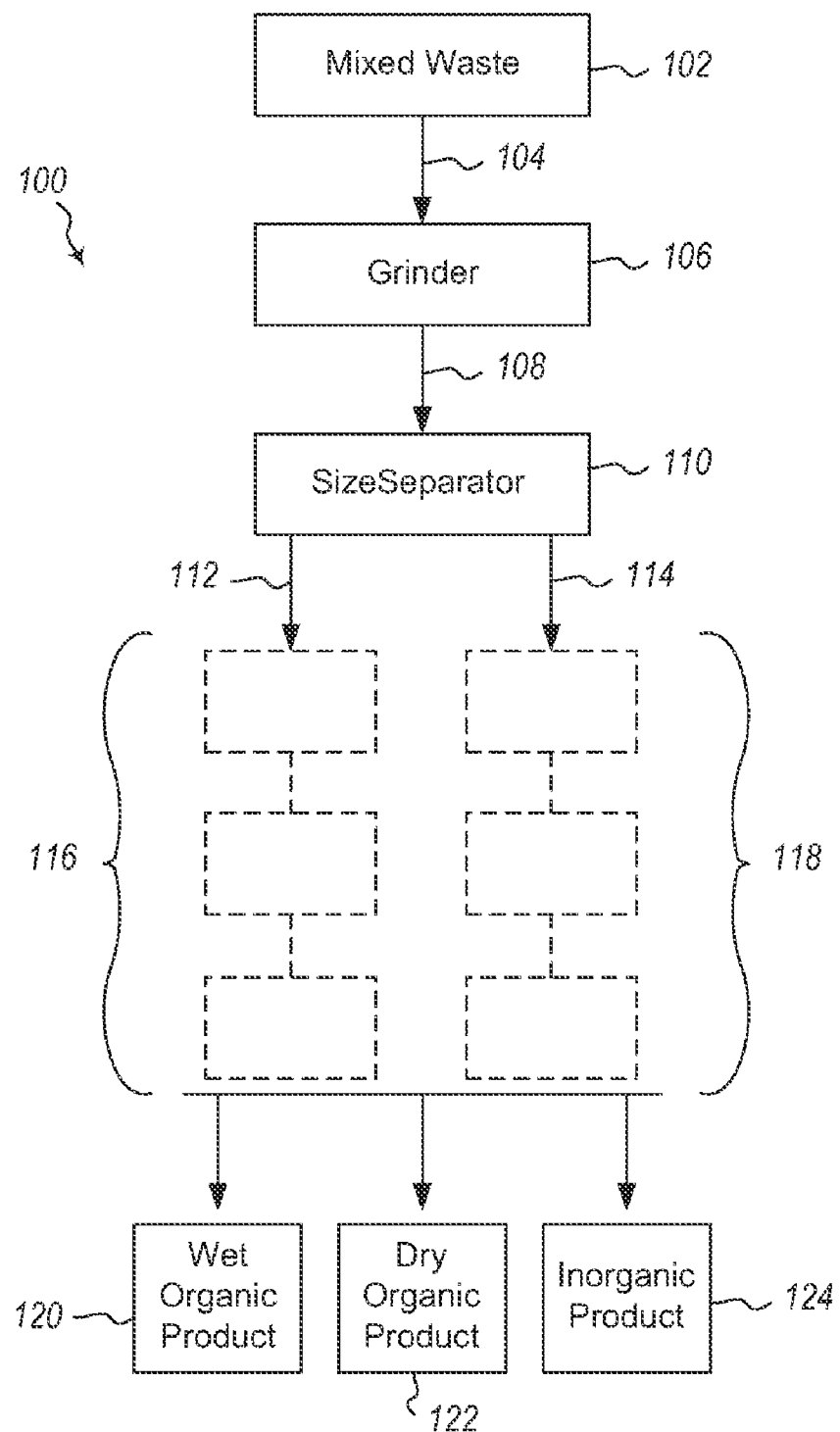
FIG. 1 is a flow diagram illustrating a method for separating solid waste, according to one embodiment of the present invention.

Referring now to FIG. 1, a flow diagram illustrating the method 100 for separating municipal solid waste is shown. In one embodiment, the method includes providing a mixed waste stream 102. The mixed waste stream may include wet organic waste, dry organic waste, and inorganic waste. In one embodiment, the weight percentage of wet organic waste, dry organic waste, and inorganic waste in the mixed waste stream 102 is each (independent of one another) at least 5%, at least 10%, at least 20%, at least 50%, or at least 75% (the sum of the three weight percentages not exceeding 100%). In one embodiment, the mixed solid municipal waste 102 may be an unprocessed municipal waste. For example, solid waste stream 102 may be provided directly from a municipal garbage collection process.

Alternatively, solid municipal waste 102 may be partially pre-processed (e.g., by home owners) to remove a portion of the recyclable and/or recoverable materials. For example, solid municipal waste 102 may be derived from a comprehensive residential or commercial waste stream that contains the remnant materials that exclude source separated materials collected through recycling programs in which a portion of certain recyclables (e.g., newspaper, cardboard, plastics, metal and/or glass containers) have been removed (i.e., the MSW may be a post-recycled waste).

In either case (i.e. methods using unprocessed MSW or source separated MSW), the mixed waste 102 may be manually pre-sorted to recover and remove items that are difficult to grind, obviously hazardous, and/or that are particularly large (i.e., easily separated) and have a high recovery value. The presorting may be performed by a loading operating loading waste into the system or may be carried out by personnel on a dedicated presorting line. For example, waste 102 may be metered onto a presorting conveyor where manual labor identifies items to be pre-sorted. Typically presorted items will include items that could damage or cause excessive wear to the grinder. Examples include automobile engine blocks, structural steel, tire rims, propane tanks, concrete blocks, large rocks, and the like. Hazardous waste is preferably removed before grinding to avoid contamination with other materials in the mixed waste. Examples of obviously hazardous waste include containers of solvents and chemicals, paint cans, batteries, and the like. Presorting can also be used to recover particularly large and valuable items that are easily picked from the mixed waste stream. Typically the recyclables recovered in the pre-sorting will be items that are several times larger than the burden depth of the process stream such that they are easily visible and efficiently removed manually. For example large cardboard boxes and metal pieces (e.g., corrugated containers) can be recovered in presorting.

The mixed municipal solid waste is conveyed to a comminuting device such as grinder or shredder (step 104). In one aspect, the conveyor in step 104 may include a metering system such as a metering wheel configured for controlling the flow and associated burden depth of MSW such that a relatively constant amount of material is fed to the grinder or shredder over time (and optionally a pre-sort conveyor).

In step 106, the mixed waste is comminuted. The grinder used to comminute the mixed waste stream may include one or more shafts that include a number of cutting heads that that can cut and/or shred incoming waste materials to a selected size. Wastes ground by the grinder will have a range of particle sizes. For example, some objects like shipping pallets or tires will be ground or shredded, but most particles will be relatively large. In contrast, materials like glass, which tends to shatter, and food waste, which tends to shred, will be quite small.

As waste materials are ground or shredded by turning rotors mounted with cutting blades or knives against a rigid blade housing, they then drop through the grinder or shredder to the screen basket (circular punch plate or finned design screens). Materials having a ground size less than a selected size, such as about 16 inches or less, about 14 inches or less, about 12 inches or less, about 10 inches less, or preferably about 8 inches or less then drop through a screen and move onto the next step in the process. Objects that are too large to pass through the screen are typically recirculated repeatedly through the grinder or shredder until they are ground to a size that can pass through the screen.

The ground or shredded solid waste can then be conveyed (step 108) to a size separator 110 that fractionates the ground or shredded municipal solid waste by size to produce an under fraction 112 enriched in wet organic material and an over fraction 114 enriched in dry organic material. Suitable examples of a size separator 110 that can be used in the present method include a disc screen separator, a trommel screen separator, a vibratory screen separator and/or other size separators known in the art.

Preferably, the comminuted waste from grinder 106 is ground or shredded to a size of about 16 inches and below, and the over fraction has a size distribution with a ratio of small particles to large particles of less than about 8. More preferably, the comminuted waste is ground or shredded to a size of about 12 inches and below, and the over fraction has a size distribution with a ratio of small particles to large particles of less than about 6. Most preferably, the comminuted waste is ground or shredded to a size of about 8 inches and below, and the over fraction has a second size distribution with a ratio of small particles to large particles of about 4 or less. Preferably, the under fraction 112 has a size of less than about 2 inches.

According to the present method, one or both of the under fraction 112 and the over fraction 114 may be further fractionated 116 and 118 by density and size to produce an intermediate stream from which valuable products may be recovered. The comminuting, size separation, and/or density separation may be used to produce any number of a wet organic product 120, a dry organic product 122, and/or and inorganic product 124. In a preferred embodiment, the product(s) recovered from the intermediate streams is a homogeneous stream. Homogeneous streams include recyclables and fuels that are sufficiently free from contamination to be recycled or used without further separation from other types of components present in the mixed waste. Homogenous products can include single materials (e.g., aluminum) or a homogenous product can include a mixture of materials that impart a necessary trait. For example, a homogenous dry organic fuel includes organics having a particular maximum water content and particle size and a minimum BTU value. The purity needed to achieve homogeneity will depend on the particular product. Those skilled in the art are familiar with purities required for recycling of recovered waste materials and the properties needed for organic fuels to be useful.

In one embodiment, either 116 or 118 may include one or more of (a) processing the under fraction 112 using a sizing screen to remove fines and then a first density separation unit to produce a heavy fraction and a light fraction, (b) processing the light fraction from the first density separation unit using a second density separation unit to produce a dry organic product and a wet organic product, (c) processing the over fraction 114 using a third density separation unit to produce a heavy fraction and a dry organic product, and/or (d) processing the heavy fraction from the third density separation using a fourth density separation unit to produce a heavy fraction and a wet organic product. The density separation steps can employ an air separator, such as an air drum separator or a gravity/air separator, a hammer mill separator, or other density separators known in the art, or a combination of these. The size or dimensional separators for fines can include disc screens, trommel screens, vibratory screen separators or other dimensional separators known in the art.

Product recovery (i.e., recovery of recyclables, wet organics, or dry organics) can be achieved using any sorting equipment suitable for the particular type of material being recovered. In aspect, the method may further include using a magnetic separation unit (e.g, drum magnets, cross-belt magnets, head pulley magnets, etc.), to recover ferrous metal fractions; a eddy current separation unit(s) to recover a non-ferrous metal fraction; or a Camera Sorting Machine(s) and/or metal detectors or other devices known to recover copper, brass and/or stainless steel non-ferrous metal or a ferrous and non-ferrous metal fraction from one or more of the under fraction, the over fraction, or the downstream portion of one of these fractions, such as, but not limited to the heavy fraction or the light fraction from the first density separation unit, the dry organic product or the wet organic product from the second density separation unit, the heavy fraction or the dry organic product from the third density separation unit, or the heavy fraction or the wet organic product from the fourth density separation unit.

In one embodiment, the wet organic products recovered in the separation method can be further processed using a microbial digestion system to produce biogas that can be used as fuel and compost that can be used as a soil amendment or dried to make an organic fuel for combustion as a carbon fuel substitute or thermal conversion into energy. Discussion and description of exemplary microbial digestion systems that can be used to digest the wet organic waste product produced in the current method can be found in U.S. Pat. No. 7,615,155 entitled "Methods for removal of non-digestible matter from an upflow anaerobic digester," U.S. Pat. No. 7,452,467 entitled "Induced sludge bed anaerobic reactor," U.S. Pat. No. 7,290,669 entitled "Upflow bioreactor having a septum and an auger and drive assembly," and U.S. Pat. No. 6,911,149 entitled "Induced sludge bed anaerobic reactor," and in U.S. Pat. Pub. No. 2008/0169231 entitled "Upflow bioreactor with septum and pressure release mechanism," the entireties of which are incorporated herein by reference.

In one embodiment, the separated dry organic materials can be further processed to produce a dry organic fuel using one or more processing methods known in the art. In one embodiment, the separated dry organic material can be further comminuted to produce a desired particle size for combustion in a furnace. In one embodiment, a separated dry organic material with an upper particle size in a range from 8-16 inches can be comminuted to produce a dry organic material with an upper particle size less than 6 inches, less than 4 inches, less than 2 inches, or less than 1 inch.

The dry organic material may also be compacted, baled, re-shredded, pelletized or otherwise densified to facilitate transportation and/or handling of the dry organic material in a combustion or conversion process. Densification can be carried out by baling, pellitizing or other compaction technique that provides a similar function. Preferably the densification uses compaction rather than pelletization and preferably produces a bale rather than a pellet. In one embodiment, the compaction produces a unit of fuel with at least one dimension greater than 4 inches. The compacted fuel may be at least about 4, 6, or 12 inches in diameter. Bales of compacted dry organic material may be one to several feet in diameter.

The dry organic material may also be stored on-site in either a bulk storage building with an automated filling and discharge system or storage silos with unloading devices.

In one embodiment, the density of the compacted material may be in a range from about 2-60 lbs per cubic foot, preferably 3-30 lbs per cubic foot, and most preferably 4-10 lbs per cubic foot.

The solid dry organic fuel can, for example, be used alone or with another fuel in place of coal and other carbon based fuels in a number of industrial and energy generation processes. The solid dry organic fuel can also be used as a fuel to make synthesis gas through a variety of emerging high temperature thermal conversion processes (e.g. gasification, plasma arc gasification and pyrolysis). The solid dry organic fuel can also be combusted in a solid fuel boiler or gasifier boiler to produce steam, which can be used to turn a steam turbine to produce electricity.

While it may be desirable to recover value from essentially all the components of a solid waste stream, the present invention includes embodiments in which all or a portion of the wet organic fraction, dry organic fraction, or inorganic fraction is not fully separated into a recovered product. For example, in one embodiment the wet organic fraction and a portion of the inorganic fraction (e.g. glass) may remain mixed and simply land filled.

The present invention is particularly advantageous for recovering the majority of a particular type of material that is present in the mixed waste stream in very low concentrations. The systems and methods allow processing of mixed waste stream to metaphorically speaking "pick the needle out of the haystack." In one embodiment, the mixed waste stream may include at least one type of recoverable material at a concentration less than 15%, less than 10%, less than 5%, or even less than 1%, where the system or method is configured to recover at least 50%, at least 70%, at least 80%, or even at least 90% of the particular recoverable material.

Figure 2:
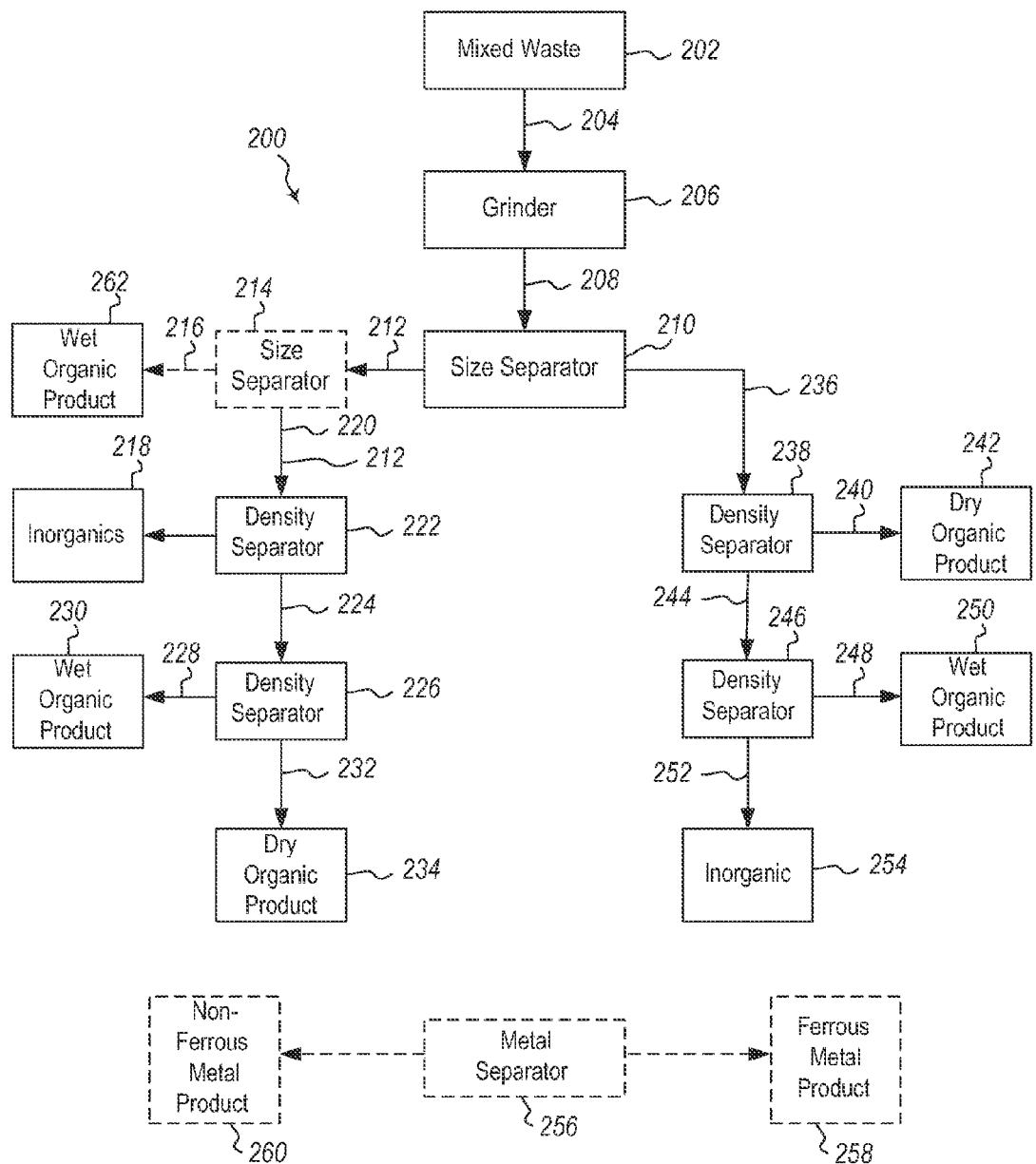
FIG. 2 is a flow diagram illustrating a method for separating solid waste, according to another embodiment of the present invention.

Referring now to FIG. 2, a method 200 for separating municipal solid waste to produce a wet organic product, a dry organic product, and an inorganic fraction therefrom is illustrated. The method includes providing a mixed municipal solid waste 202 that includes a wet organic fraction, a dry organic fraction, and an inorganic fraction. The mixed municipal solid waste may optionally be presorted as described above with reference to FIG. 1. In step 204, the mixed waste is conveyed to a solid waste grinder or shredder 206. Optionally the comminuted solid waste can be passed under a suspended magnet (not shown) to recover ferrous metal, and the remaining comminuted waste 208 is then conveyed to a first size separator 210. First size separator 210 separates the comminuted waste based on size to produce an under fraction 212 and an over fraction 236.

The method 200 further includes conveying the under fraction 212 from the first size separation unit 210 to a first density separation unit 222. The first density separation unit 222 can be an air drum separator that uses air flow and a rotating drum to separate materials by density. Other air separation devices that function similarly can be used and are known in the art. The first density separation unit separates the under fraction from the size separator 210 to produce a heavy fraction 218 comprising primarily inorganic material and a light fraction 224 comprising a mixture of dry organics and wet organics. The light fraction 224 can be processed in subsequent density separation steps.

In an optional step, the under fraction 212 from the first size separation unit 210 can instead be conveyed to an optional second size separation unit 214 that is configured to produce an under fraction 216 and an over fraction 220. The under fraction 216 is a fine fraction (e.g., less than ⅜ inch) and is primarily a wet organic product with a small percentage of inorganic material. The coarse fraction 220 is conveyed to density separator 222 and treated similar to fraction 212 as described above.

Examples of suitable size separators 214 that can be used in the present method include a disc screen separator, a trommel screen separator, vibratory screen separator and/or other size separators known in the art. In one embodiment, the method 200 may include an optional step of processing the wet organic product 218 from the second size separation unit 214 to remove at least a portion of residual inorganic debris therefrom. In one embodiment, the residual inorganic debris includes broken glass.

In one embodiment, the second over fraction 220 has a size distribution with a ratio of small particles to large particles of less than about 5 and the second under fraction 216 has an upper particle size of less than about ⅕ of the large particle size of the over fraction 220. For example, the over fraction 220 from the second size separation unit 214 may have a size distribution in a range from about 2" to about ⅜" and the under fraction 216 has an upper particle size of less than about ⅜".

Returning to light fraction 224, the light fraction 224 from the first density separation unit 222 can be conveyed to a second density separation unit 226. The second density separation unit can be a gravity/air separation unit that uses air flow to separate materials by density. The second density separation unit produces or separates a heavy fraction 228 wet organic material and a light fraction 232 dry organic material. In one aspect, the heavy fraction 228 is a wet organic product and the light fraction 232 is a dry organic product 234. The wet organic product 230 may be combined with wet organic product 262 for further processing and/or process separately and/or used in the same or distinct processes (e.g., land filled as residue or used to generate a biofuel in an anaerobic digester.

Returning now to the over fraction 236, the over fraction from the first size separation unit 210 is conveyed to a third density separation unit 238. The third density separation unit 238 can be an air drum separator that uses air flow and a rotating drum to separate materials by density. The third density separation 238 unit separates the over fraction from the size separator 210 to produce a light fraction 240 and a heavy fraction 244. The light fraction 240 is primarily a dry organic product 242.

The heavy fraction 244 from the third density separation unit 238 is conveyed to a fourth density separation unit 246. The fourth density separation unit 246 can be a gravity/air separation unit that uses air flow to separate materials by density or it can be an air drum separator that uses air flow and a rotating drum to separate materials by density. Other devices that can be used for forth density separator include a hammermill separator (e.g., a Scott Turbo Separator) or a disc screen or vibrating screen or a combination of these. The fourth density separation unit produces a light fraction 248 and a heavy 252. In one aspect, the heavy light fraction 248 is a wet organic product 250 and the heavy fraction includes an inorganic fraction 254.

The density separator units (e.g., first, second, third, or fourth density separation units) may be calibrated to provide separation between wet organics, dry organics, and inorganic materials. In mixed municipal waste streams, these three different materials often exhibit densities within particular ranges. For example, dry organics tend to have a density of less than about 10 or 12 lbs/cubic foot; wet organics tend to have a density greater than 8, 10, or 12 lbs/cubic foot and less than about 60, 80, or 100 lbs/cubic foot; inorganic materials tend to have a density greater than about 80 or 100 lbs/cubic foot. Thus, by setting the density separators accordingly, the wet organic, dry organic, and inorganic fractions may be separated based on density. Comminuting the mixed MSW prior to density separation increases the separation efficiencies of the density separators.

In one embodiment, the method 200 may include a number of optional steps using metals separator systems 256, such as magnets or eddy current separators or camera optical sorting machines or metal detectors or other devices know in the art, to recover one or more of a ferrous metal product 258 or non-ferrous metal products from one or more of the fractions produced in the method 200. The method of claim 37, further comprising processing the under fraction from the first size separation unit using a magnetic separation unit to recover a ferrous metal fraction therefrom.

For example, the metal separation units 256 may be used to recover any ferrous and non-ferrous metal fractions from one or more of under fraction 212, the over fraction 236, the heavy fraction 218 or the light fraction 224 from the first density separation unit 222, the dry organic product 234 or the wet organic product 230 from the second density separation unit 226, the heavy fraction 244 or the dry organic product 242 from the third density separation unit 238, or the inorganic fraction 254 or the wet organic product 250 from the fourth density separation unit 246.

Figure 3:
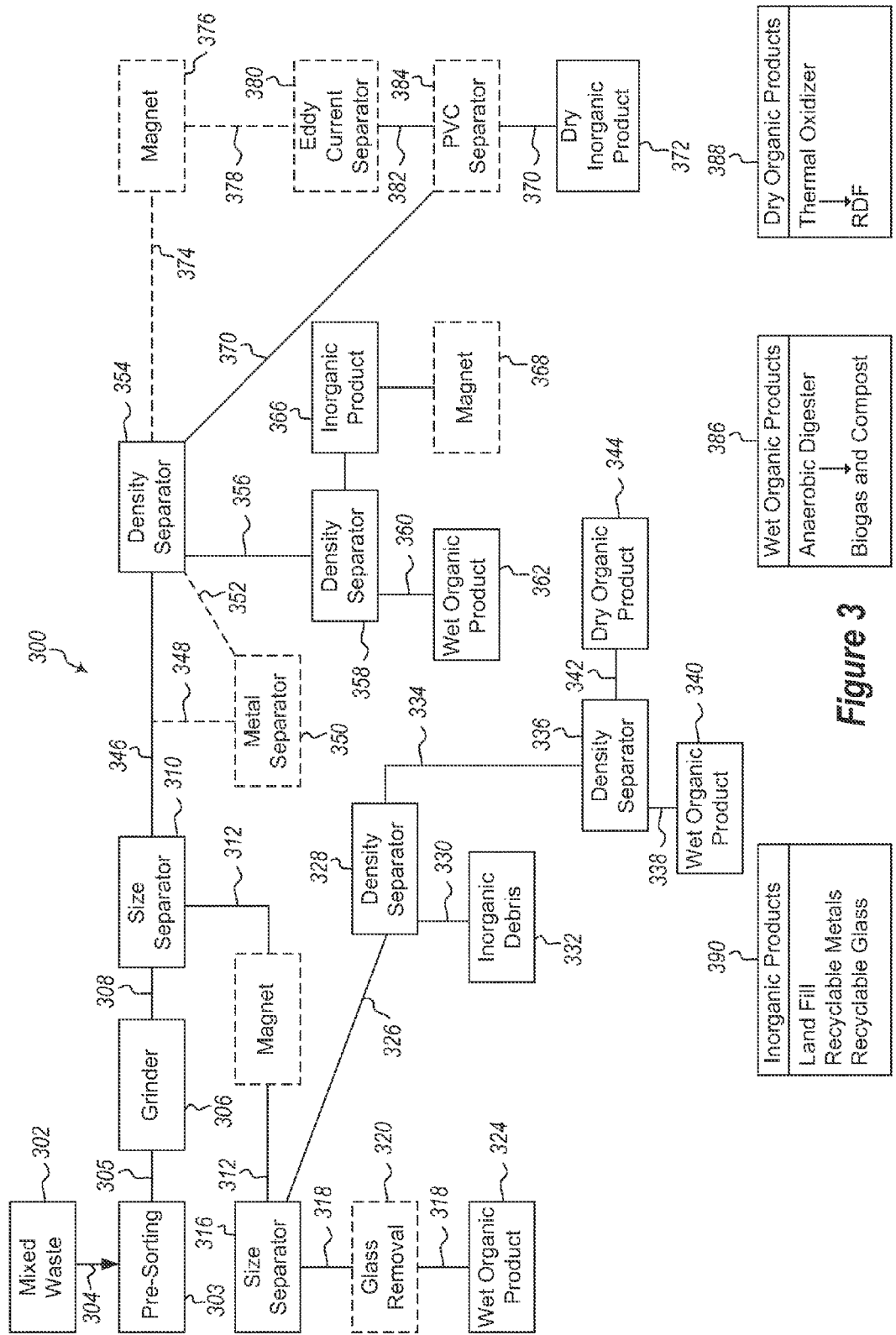
FIG. 3 is a flow diagram illustrating a method for separating solid waste, according to yet another embodiment of the present invention.

Referring now to FIG. 3, a method 300 for separating municipal solid waste to produce a wet organic product, a dry organic product, and an inorganic debris residue product is illustrated. The method 300 includes, providing an initial municipal solid waste stream 302 that includes wet organic waste, dry organic waste, and inorganic waste, and conveying 304 the waste 302 to a solid waste grinder or shredder 306. The initial municipal solid waste 302 is ground or shredded to produce a ground or shredded waste 308 having a distribution of particle sizes. The ground or shredded waste 308 is then conveyed to a first size separation unit 310 to produce a first under fraction 312 enriched in wet organic material and a first over fraction 346 enriched in dry organic material. According the present invention, each of the under fraction 312 and the over fraction 346 may be further processed by density, and to a lesser extent, by additional size separation to separate the under and over fractions 312 and 346 into wet organic products, dry organic products, and inorganic debris products.

In one aspect, the method 300 further includes processing the first under fraction 312 from the first size separation unit 310 using an optional first magnetic separation unit 314 to recover a ferrous metal fraction therefrom, and further processing the first under fraction 312 from the first size separation unit 310 using a second size separation unit 316 to produce a second under fraction 318 comprising wet organic product 324 and a residual inorganic debris and a second over fraction 326 comprising dry organic material, wet organic material, and inorganic debris. Optionally, the method 300 may include processing the second under fraction 318 with a glass removal apparatus 320 to remove at least a broken glass portion therefrom and produce the wet organic product 324.

In one aspect, the method 300 further includes processing the second over fraction 326 from the second size separation unit 316 using a first density separation unit 328 to produce a light fraction 330 and a heavy fraction 334, wherein the light fraction 330 comprises a residual inorganic debris 332, and wherein the heavy fraction 334 comprises wet organic material and dry organic material. The heavy fraction 334 from the first density separation unit 328 may be further processed using a second density separation unit 336 to produce a light fraction 342 and a heavy fraction 338. The light fraction comprises a first dry organic product 344. The heavy fraction 338 comprises a wet organic product 340.

Returning to the output from the first size separation unit 310, the over fraction 346 from the first size separation unit 310 may be processed using a third density separation unit 354 to produce a heavy fraction 356 and a light fraction 370. Optionally, the over fraction 346 from the first size separation unit 310 may be processed with an optional metal separation unit 350 positioned prior to the third density separation unit 354 to remove a ferrous or non-ferrous metal fraction from the over fraction from the first size separation unit 310. In either case, the heavy fraction 356 includes wet organic material, ferrous metals, and inorganic debris. The light fraction 370 includes dry organic material, ferrous metals, and non-ferrous metals.

In one aspect, the method 300 further includes processing the heavy fraction 356 from the third density separation unit 354 using a fourth density separation unit 358 to produce a heavy fraction 360 and a light fraction 364. The heavy fraction 360 includes a third wet organic product 362. The light fraction 364 comprises an inorganic product 366 that includes ferrous metals, non-ferrous metals, and inorganic debris. Optionally, the method 300 may include processing the light fraction 364 from the fourth density separation unit 358 using a second magnetic separation unit 368 to recover a ferrous metal fraction therefrom.

Returning to the output from the light fraction 370 from the third density separation unit 354, the method 300 further includes processing the light fraction 370 from the third density separation unit 354 using an optional PVC separator 384 to produce a product 370 that includes a dry organic product 372. Optionally, the light fraction from the third density separation unit can be conveyed 374 to a third magnetic separation unit 376 to recover a ferrous metal fraction therefrom. The residual fraction 378 can be processed using an eddy current separation unit 380 to recover a non-ferrous metal fraction therefrom. The residual fraction 382 from the eddy current separator 380 can then be processed using an optional PVC separator 384 to produce a product 370 that includes a dry organic product 372. The optional PVC separator(s) can also be programmed to recover certain recyclable plastics such as PETE and HDPE.

The wet organic products 386 can be further processed using one or more anaerobic digesters to produce a biogas that can be used as a fuel and a compost that can be used as a soil amendment or dried to make an organic fuel for combustion as a carbon fuel substitute or thermal conversion into energy. The dry organic fuel products 388 can, for example, be used alone or with another fuel in place of coal and other carbon based fuels in a number of industrial and energy generation processes. The dry organic fuel can also be used as a fuel to make synthesis gas through a variety of emerging high temperature thermal conversion processes (e.g. gasification, plasma arc gasification and pyrolysis). Recyclable metals and glass can be recovered from the inorganic fractions 390 and the residual material can be landfilled or processed into construction products.

Preferably, the methods and apparatuses described herein can be used to recover at least about 50% of each of the wet organic materials and the dry organic materials and the ferrous metals and non-ferrous metals, in the initial solid waste stream. More preferably, at least about 75% of each of the wet organic materials and the dry organic materials and the ferrous metals, non-ferrous metals and glass contained in the initial solid waste stream can be recovered using the methods and apparatuses described herein. Even more preferably, at least about 90% of each of the wet organic materials and the dry organic materials and the ferrous metals, non-ferrous metals and glass contained in the initial solid waste stream can be recovered using the methods and apparatuses described herein. Most preferably, at least about 95% of each of the wet organic materials and the dry organic materials and the ferrous metals, non-ferrous metals and glass contained in the initial solid waste stream can be recovered using the methods and apparatuses described herein.

Figure 8:
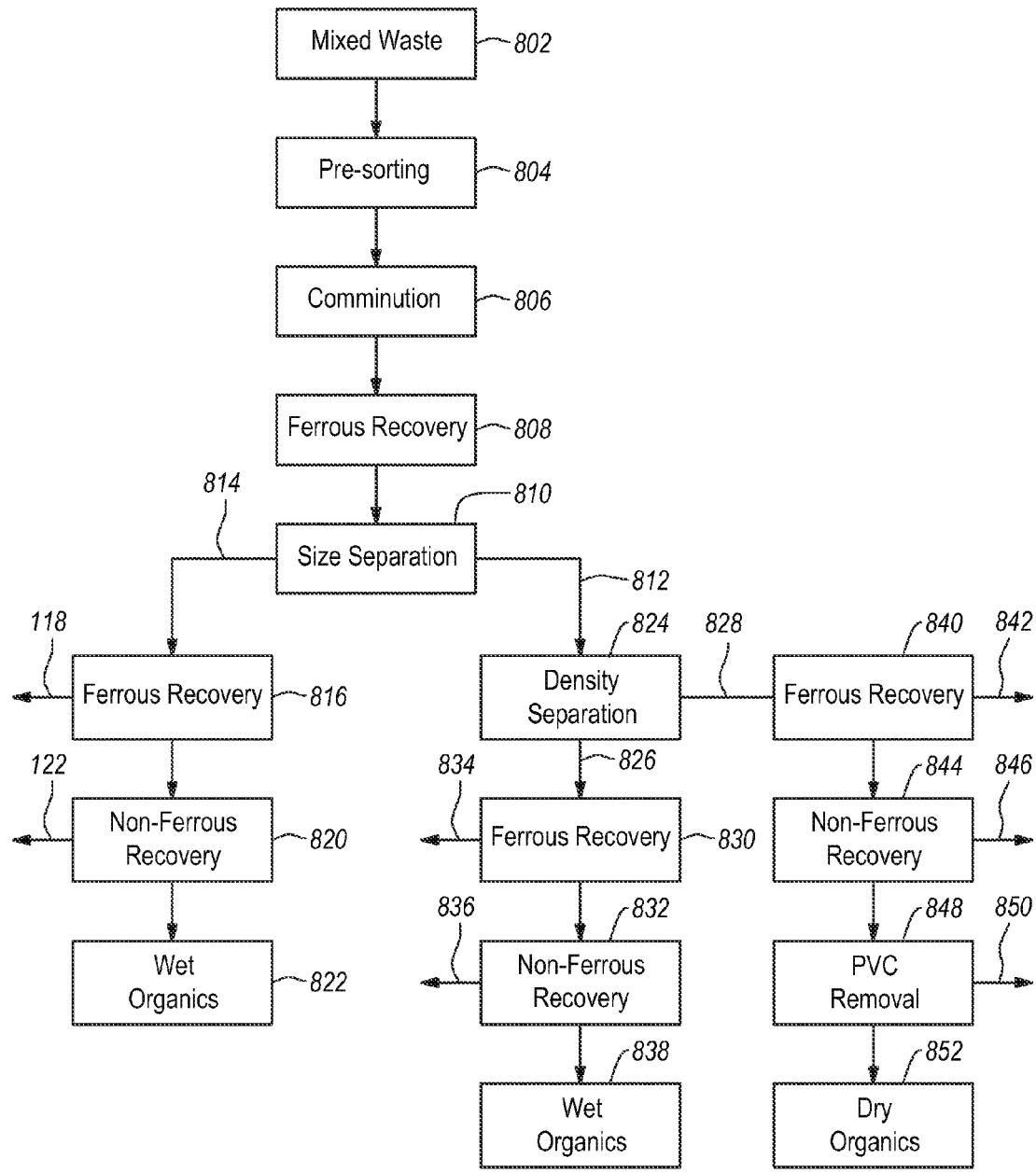
FIG. 8 is a flow diagram illustrating a method for separating solid waste, according to yet another embodiment of the present invention.

FIG. 8 illustrates an alternative embodiment in which metal recovery is achieved using a plurality of metal separating devices at a plurality of locations within the process flow. In FIG. 8, a mixed waste 802 is metered to a presorting conveyor and sorted in step 804. The presorting step may be carried out in a similar manner as described above with regard to FIG. 1. In step 806, the remaining mixed waste is comminuted to produce a first size distribution. In step 808, the comminuted waste is then passed by a magnet to recover a portion of the ferrous metal. Due to burden depth, the magnet used in step 808 is preferably a suspended magnet (e.g. a drum magnet) although other magnets may be used alone or in combination with a suspended magnet. Drum magnets are advantageous due to the burden depth prior to size sorting.

Following ferrous recovery, the mixed stream is separated by size (step 810). Size separation 810 may be carried out as described with regards to FIGS. 1-3 above or FIG. 4 below. Size separation produces an over fraction 812 and an under fraction 814. Over fraction 812 is enriched in dry organics and under fraction 814 is enriched in wet organics. Under fraction 814 may be further processed in step 816 using magnets to recover a ferrous product 818 and yet further processed in step 120 using an eddy current separator to produce a non-ferrous product 122. The remaining stream may be primarily wet organics 822, but may also include a substantial percentage of non-metal inorganic material. The wet organics and/or non-metal inorganic materials may be landfilled or further processed as described herein.

The over fraction 812 is enriched in dry organics and is further fractionated using density separation (step 824) to produce a plurality of intermediate waste streams. Density separation 824 produces a heavy fraction 826 and a light fraction 828. Heavy fraction 826 is enriched in wet organics and inorganic materials. Heavy fraction 826 may be processed in steps 830 and 832 to recover ferrous metals 834 and non-ferrous metals 836 similar to steps 816 and 820, respectively (and producing wet organic product 838 that may be processed or discarded. Optionally heavy fraction 826 can be combined with under fraction 814 to perform the ferrous and/or non-ferrous recovery steps. Since the burden depth in steps 816 and 830 is lower than in step 808, a cross-belt magnet is typically sufficient to capture the ferrous metals (although a suspended magnet may be used if desired). The non-ferrous recovery is typically carried out using an eddy current separator apparatus or similar device.

The light fraction 828 from density separator 824 is enriched in dry organics. Light fraction 828 may be processed in step 840 using magnets to recover ferrous metals 842. In one embodiment, a suspended magnet may be used.

Light fraction 828 may be further process to recover non-ferrous metals 846 (step 844). Step 844 may be carried out using one or more eddy current separators or devices that perform a similar function. In addition to recovery of non-ferrous metals, light fraction 828 may also be processed to remove polyvinyl chloride (PVC) plastics and/or recover certain recyclable plastics such as PETE and/or HDPE 850 to yield a dry organic product 852.

Figure 9:
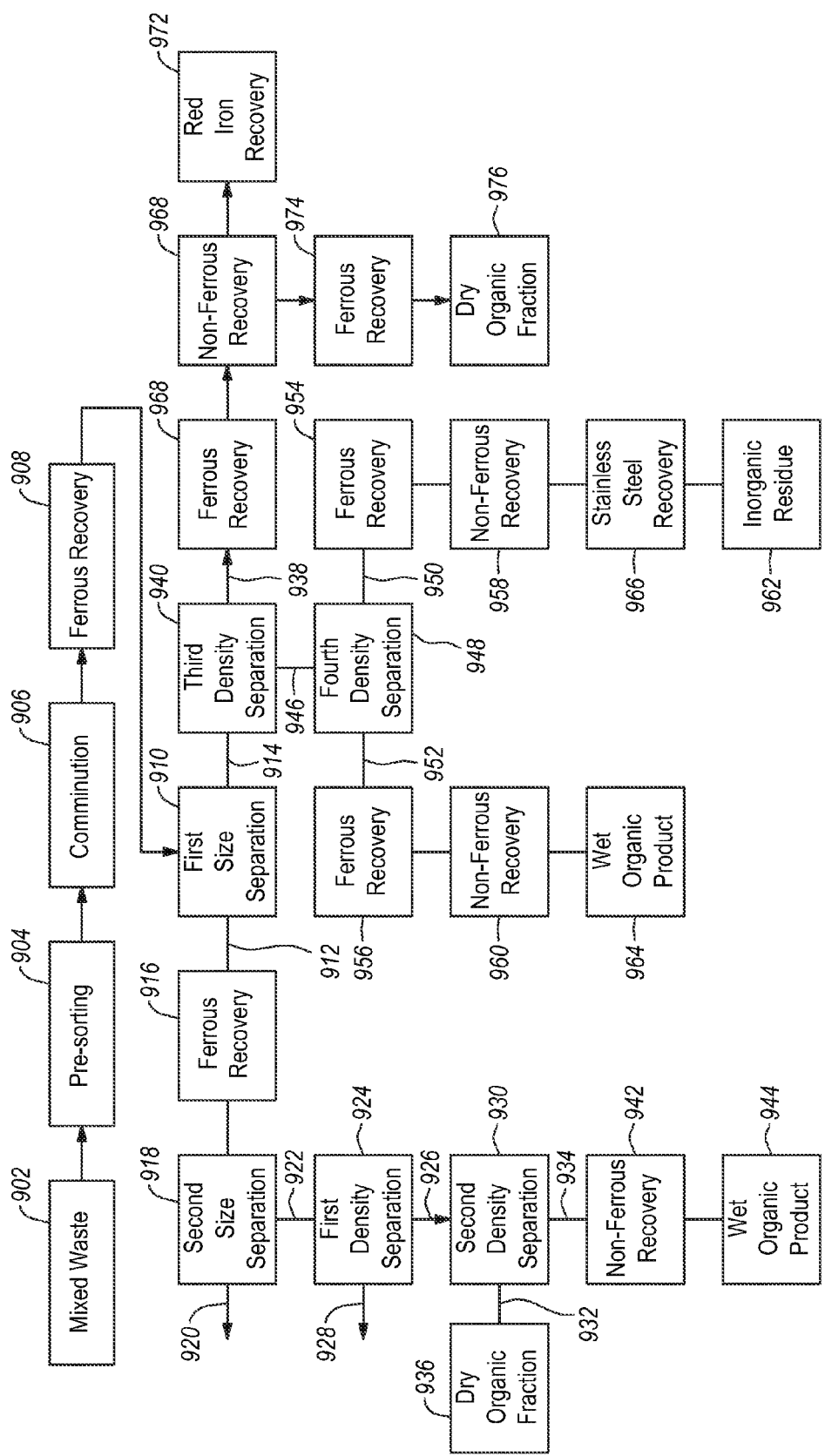
FIG. 9 is a flow diagram illustrating a method for separating solid waste, according to yet another embodiment of the present invention.

FIG. 9 illustrates yet another embodiment illustrating a process flow including a plurality of metal recovery devices. Unless otherwise specified, the steps described in FIG. 9 may be carried out in a similar manner as corresponding steps described in FIGS. 1-4 and 8 above. With reference to FIG. 9, a solid municipal waste 902 is provided that includes a mixture of wet organic material, dry organic material, and inorganic material. In step 904, the mixed municipal waste 902 is metered to a pre-sorting conveyor where high value items, difficult to grind items, and/or hazardous materials are manually picked from the waste stream. In step 906, the presorted mixed waste stream 902 is comminuted to produce a mixed stream 902 having a desired particle size distribution. Following comminution and prior to size separation, ferrous metals can be recovered (step 908) using a magnet. In one embodiment, the magnet may be a suspended magnet (e.g., a drum magnet) although other magnets such as cross-belt magnets may also be employed.

In step 910, the mixed waste stream 902 is fractionated in a first size separation to produce two intermediate waste streams, an under fraction 912 (i.e., the fine fraction) and an over fraction 914 (i.e., the coarse fraction). The under fraction 912 may be process to recover additional ferrous metals (step 916). In step 916, the burden depth of the under fraction 912 will typically be lower than comminuted mixed waste 902 since a portion of the waste stream is separated in step 910. The lower burden depth can expose additional ferrous metals that may have passed through step 908 without being recovered. Under fraction may be further separated by size in step 918 to produce a fine wet product 920 and a coarse under fraction 922. Fine wet product 920 may be primarily wet organic product but may also include a small amount of inorganic material. Fine wet product 920 may be processed to remove non-ferrous metals, digested to extract the caloric value of the organics, or landfilled as residue.

In step 924, the coarse wet fraction 922 is separated in a first density separator to produce a residual inorganic fraction 928 and a mixed light stream 926 that includes wet organics and dry organics. In step 930, the mixed light stream 926 is delivered to a second density separation and separated into a light stream 932 and a heavy stream 934. Light stream 932 includes primarily dry organics 936. Dry organics 936 may be combined with a light fraction 938 from third density separation 940 to be processed into a dry organic product or processed separately.

The light fraction 934 includes primarily wet organics. Light fraction 934 may be process to recover non-ferrous metals (step 942) thereby yielding a wet organic product 944.

The over fraction 914 from first size separation 910 is further processed in a third density separator (step 940) to produce a light fraction 938 and a heavy fraction 946. Light fraction 938 includes primarily dry organics and heavy fraction 946 includes a mixture of wet organics and inorganic materials. Heavy fraction 946 is further processed in a fourth density separator (step 948) to produce a heavy fraction 950 and a light fraction 932. Heavy fraction 950 and light fraction 952 can be further processed separately to recover ferrous metals (steps 954 and 956, respectively) and to recover non-ferrous metals (steps 958 and 960, respectively) to yield wet organics 964 and inorganic residue 962. In steps 956 and 954 ferrous metals can be recovered using a cross-belt magnet or other suitable magnet. In steps 958 and 960, non-ferrous recovery can be carried out using an eddy current separator or other suitable device.

Heavy fraction 950 may also be processed to recover stainless steel (step 966). Recovering stainless steel may be carried out using a stainless steel metal detector sorter or other suitable device.

Light fraction 938 from the third density separator 938 is processed to produce a dry organic product 976. In step 968, ferrous metals can be removed using a suspended magnet or other suitable magnet. In step 969, non-ferrous metal 970 can be recovered using one or more eddy current separators. In some embodiments, light fraction 938 may include substantial quantities of non-ferrous materials (e.g., aluminum). In these embodiments, two or more eddy current separators placed in series may be used to improve the efficiency of non-ferrous metal recovery. The non-ferrous metals 970 may optionally be further processed to remove red iron (step 972). Removing red iron (e.g., copper and brass) can be carried out using a camera sorter and metal detector or other device.

Following recovery of non-ferrous metals, light fraction 938 may also be processed to remove polyvinyl chloride (PVC) plastics (step 974) and recover certain recyclable plastics such as PETE and HDPE. The removal of PVC and recovery of PETE and HDPE can be carried out using one or more optical sorters. The resulting light fraction 938 (i.e., following PVC removal) is a dry organic product 976 that may be used to as an organic fuel as described herein.

III. Systems for Separating Municipal Solid Waste

Figure 4:
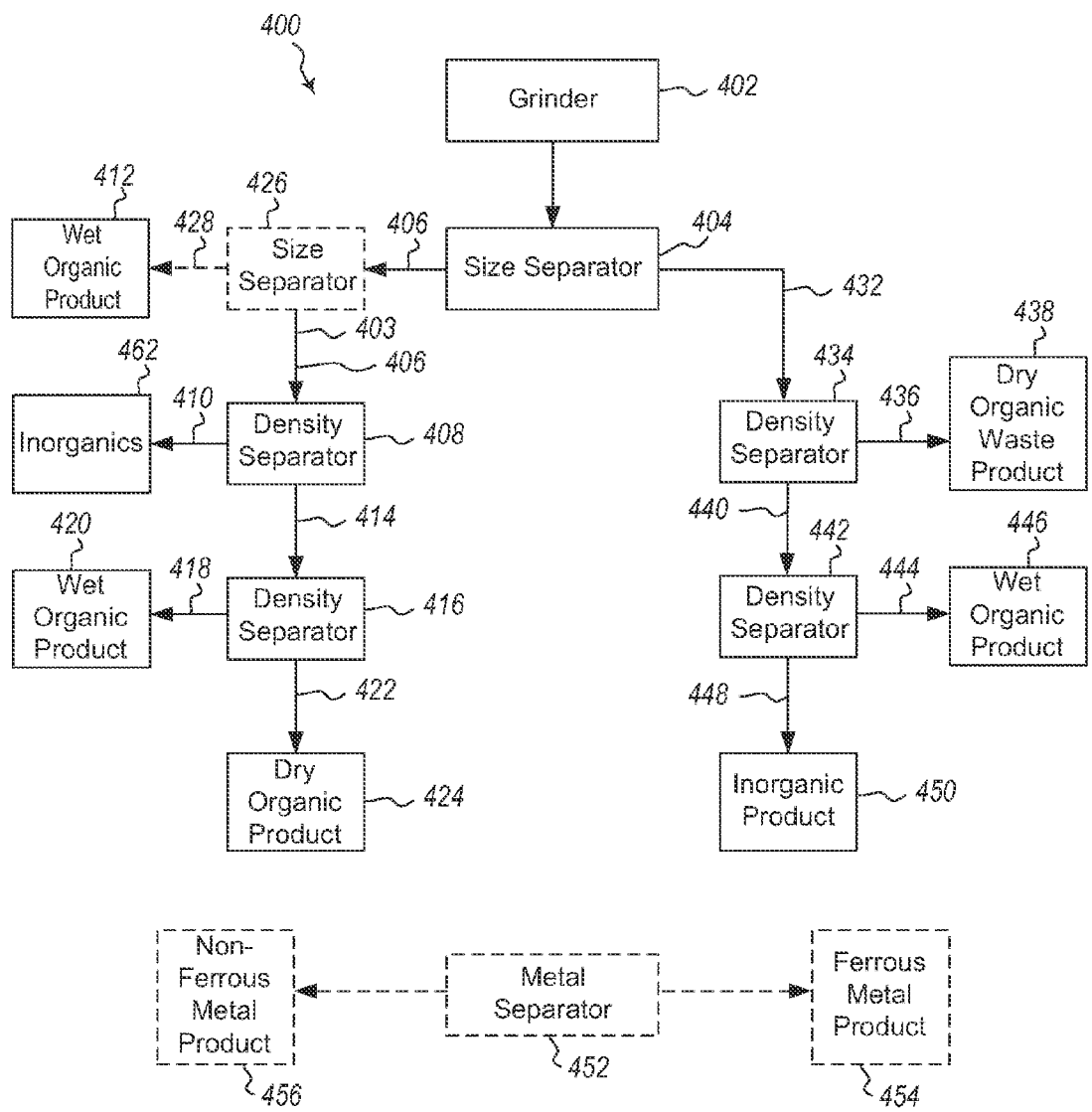
FIG. 4 is a flow diagram illustrating a system for separating solid waste, according to one embodiment of the present invention.

Referring now to FIG. 4, a system 400 for separating municipal solid waste is disclosed. In one aspect, the system 400 includes a comminuting device 402 configured for comminuting an initial municipal solid waste to produce a comminuted waste having a first size distribution. A number of solid waste grinders or shredders available in the marketplace are either adapted or can be adapted for grinding the initial solid waste stream. For example, Vecoplan, LLC of High Point, N.C. makes a number of solid waste shredders that can be incorporated into the system 400 described herein.

A typical solid waste grinder or shredder may include one or more shafts that include a number of cutting heads that that can cut and/or shred incoming waste materials to a selected size. Wastes ground or shredded by the grinder or shredder will have a range of particle sizes. For example, some objects like shipping pallets or tires will be ground or shredded, but most particles will be relatively large. In contrast, materials like glass, which tends to shatter, and food waste, which tends to shred, will be quite small.

The product of the solid waste grinder or shredder 402 can be conveyed to a first size separator 404. Suitable examples of size separators include trommel screens, vibratory screens, finger screens, disc screens, and the like. Preferably, the first size separator 404 is a disc screen. Disc screens are available from Vecoplan, LLC of High Point, N.C. A disc screen employs a series of rolling shafts having a series of attached discs with spaces between the discs that objects can fall through. The rolling of the shafts creates a unique wavelike action that agitates the incoming material as it is conveyed forward. This agitation releases smaller materials through the screen openings and is accomplished without vibration or blinding. The disc screen design greatly reduces the possibility of jamming or seizing during operation. When compared to trommels, vibratory, or finger screens, advantages of disc screens include high capacity, small footprint, accurate material sizing, self-cleaning action and low operational and maintenance costs.

As waste materials are ground or shredded in the comminuting device 402 by turning rotors mounted with cutting blades or knives against a rigid blade housing, they then drop through the grinder or shredder to the screen basket. Materials having a ground size less than a selected size, such as about 16 inches or less, about 14 inches or less, about 12 inches or less, about 10 inches less, or preferably about 8 inches or less then drop through a screen where they can be processed by the first size separator 404. Objects that are too large to pass through the screen are typically recirculated repeatedly through the grinder or shredder until they are ground to a size that can pass through the screen.

Preferably, the comminuted waste from comminuting device 402 is ground or shred to a size of about 16 inches and below, more preferably less than about 12 inches and below, and most preferably less than about 8 inches and below. The over fraction from the size separator 404 preferably has a size distribution with a ratio of small particles to large particles of less than about 10 (i.e., the ratio of the upper cut-off to the lower cut-off has a ratio less than about 10), more preferably, less than about 8, even more preferably less than about 6, and most preferably less than about 4. Preferably, the under fraction from the first size separator 404 has a top size cut-off of less than about 6 inches, more preferably less than about 5 inches, more preferably less than about 4 inches, even more preferably less than about 3 inches, and most preferably less than about 2 inches.

The system 400 further includes, a first density separation unit 408 configured for processing the under fraction 406 from the first size separation unit 404 to produce a first heavy fraction 410 (i.e., a wet organic product 412) and a first light fraction 414. The system 400 further includes a second density separation unit 416 configured for processing the light fraction 414 from the first density separation unit 408 to produce a light fraction 422 (i.e., a dry organic product) and a heavy fraction 418 (i.e., a wet organic product 420).

Optionally, the system may include a second size separation unit 426 disposed between the first size separation unit 404 and the first density separation unit 408. The second size separation unit 426 is configured to produce a second over fraction 403 and a second under fraction 428. The second under fraction 428 includes a wet organic product 412. The second over fraction 403 is conveyed to the first density separation unit 408.

In one aspect, the second size separation 426 unit is configured to produce a second over fraction 403 having a second size distribution with a ratio of large particles to small particles has a size distribution with a ratio of less than about 10, more preferably less than about 8, even more preferably less than about 6, and most preferably less than about 4 and a second under fraction 428 having an upper particle size of less than about $1/10^{th}$ of the large particle size of the over fraction, more preferably less than $1/8^{th}$, even more preferably less than $1/6^{th}$, and most preferably less than $1/4^{th}$. In another aspect, the second over fraction 403 has a range of particle sizes from about 2" to about 3/8". In yet another aspect, the under fraction from the second size separation unit 426 has a size of less than about 3/8" or less than about 1/2".

Returning to the over fraction 432 from the first size separation unit 404, the system 400 can further include a third density separation unit 434 configured for processing the over fraction 432 to produce a heavy fraction 440 and a light fraction 436 (i.e., dry organic product 438), and a fourth density separation unit 442 configured for processing the heavy fraction 440 from the third density separation unit 434 to produce a heavy fraction 448 and a light fraction 444 (i.e., a wet organic product 446).

The system 400 can optionally include at least one metal separation unit 452 that may include one or both of a magnetic separation unit or an eddy current separation unit configured for recovering a ferrous metal fraction 454 or a non-ferrous metal 456 from one or more of the under fraction, the over fraction, or a downstream portion of these fractions.

Figure 5:
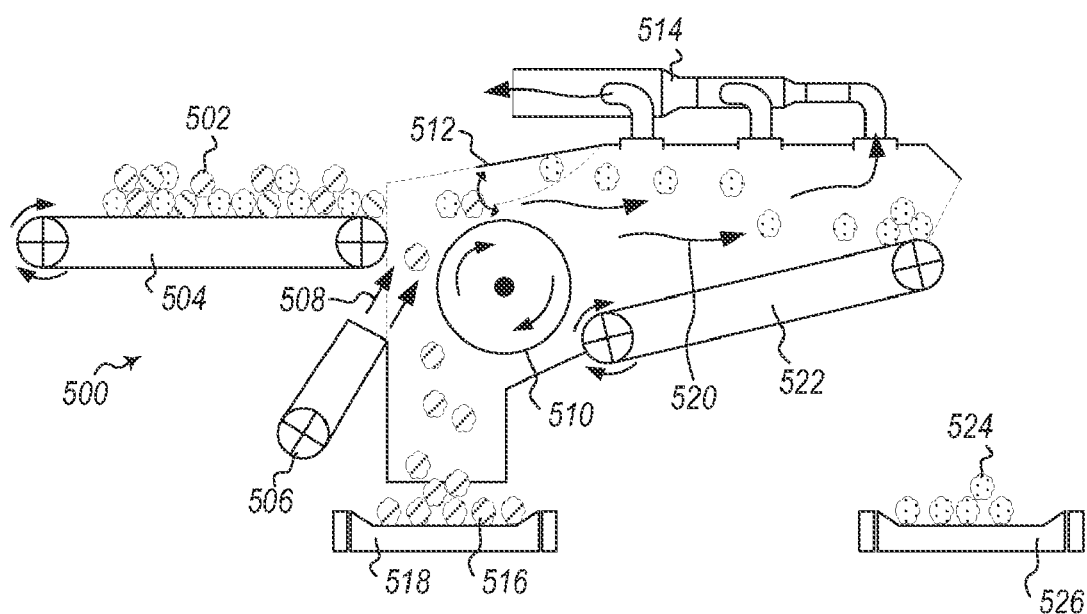
FIG. 5 illustrates a cut-away view of an air drum separator adapted for use in the system for separating solid waste, according to one embodiment of the present invention.
Figure 6:
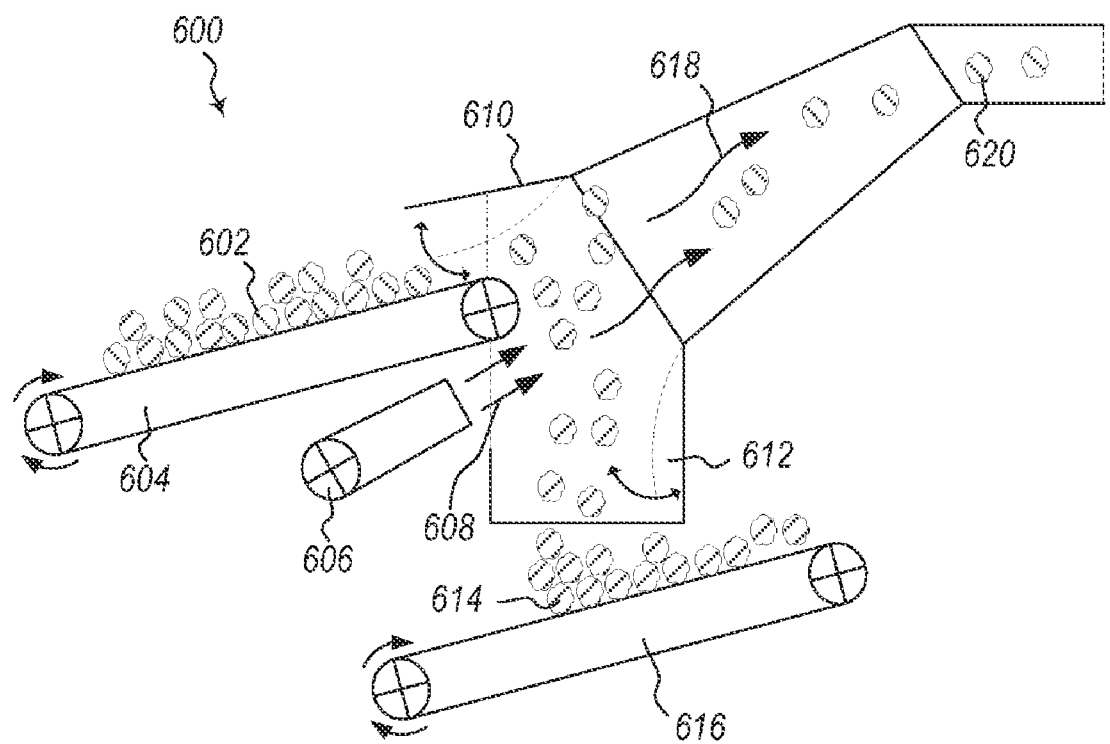
FIG. 6 illustrates a cut-away view of a gravity/air separation unit adapted for use in the system for separating solid waste, according to one embodiment of the present invention.

Referring now to FIGS. 5 and 6, examples of density separation units that are well adapted for separating municipal solid wastes by density are shown. While the particular examples illustrated in FIGS. 5 and 6 may be preferred in some embodiments, other separators can be used. Density separators suitable for use in the present invention include, but are not limited to air separators available from Westeria Fördertechnik GmbH, Ostbevern, Germany. FIG. 5 illustrates a so-called air drum separator 500. FIG. 6 illustrates a gravity/air separator 600, which is known by one manufacturer as a Windsifter.

The air drum separator 500 illustrated in FIG. 5 includes an input conveyor 504, a blower 506, a rotating drum 510, an output conveyor 522, a heavy fraction conveyor 518, a light fraction conveyor 526, and an air return unit 514. Mixed density wastes 502 are fed in on the input conveyor 504. As the waste material 502 is fed in, it drops off the end of the conveyor 502 where the wastes 502 encounter a stream of moving air 508 from the blower 506.

The heavy fraction 516 is separated from the mixed waste material 502 by virtue of being too heavy to be lifted by the airstream 508. The heavy fraction thus falls down in front of the drum 510 and falls on to the heavy fraction conveyor 518. In contrast, the lighter wastes are lifted up by the airstream 508 and carried over the rotating drum 510 and carried forward either by the air flow 520 or by the conveyor 522. The light fraction 524 drops off the end of conveyor 522 and onto the light fraction conveyor 526. These machines are highly adjustable to alter the weight density separation coefficient, as desired.

The relative density of the heavy fraction 516 and the light fractions 524 can be adjusted by controlling the airflow through the air drum separator 500. The velocity of the airflow and the volume of air passing through the drum separator 500 can be controlled either by increasing or decreasing the velocity of fan 506 or by opening or closing valve 512. In general, opening valve 512 and/or increasing the velocity of the fan 506 will carry heavier objects over the drum 510 such that the light fraction will have a higher average mass. Likewise, closing valve 512 or lowering the velocity of the fan 506 will cause the heavy fraction 516 to have a lower average mass and the light fraction 524 will have a lower average mass because only the lighter objects will be carried over the drum 510.

Referring now to FIG. 6, the gravity/air separator 600 includes an input conveyor 604, a blower 606, an air expansion chamber 622, a heavy fraction conveyor 616, and a first valve 610 and a second valve 612 for controlling the volume of air flowing through the gravity/air separator 600. Mixed density wastes 602 are fed in on the input conveyor 604. As the waste material 602 is fed in, the wastes 602 drop off the end of the conveyor 602 where they encounter a stream of moving air 608 from the blower 606.

The heavy fraction 614 is separated from the mixed waste material 602 by virtue of being too heavy to be lifted by the airstream 608. The heavy fraction 614 thus falls down on to the heavy fraction conveyor 616. In contrast, the lighter wastes 620 are lifted up by the airstream 608 and carried into and out of the expansion chamber 622 by air flow 618.

The relative density of the heavy fraction 614 and the light fractions 620 can be adjusted by controlling the airflow through the drum separator the gravity/air separator 600. The velocity of the airflow and the volume of air passing through the gravity/air separator 600 can be controlled either by increasing or decreasing the velocity of fan 606 or by opening or closing the first valve 610 and the second valve 612. In general, opening valve 610 and/or 612 and/or increasing the velocity of the fan 606 will carry heavier objects up into the expansion chamber 622 such that the light fraction will have a higher average mass. Likewise, closing valve 610 and/or 612 or lowering the velocity of the fan 606 will cause both the heavy fraction 614 and the light fraction 620 to have a lower average mass because only the lighter objects will be carried up by the air flow 618 into the expansion chamber 620.

Density separators like those illustrated in FIGS. 5 and 6 and the like work best when the ratio between the largest and smallest objects being fed into the density separator is relatively narrow. Accordingly, it is preferable that the ratio of the largest to smallest objects that are fed into the density separators in the methods and systems described herein be about 12 to 1, about 10 to 1, about 8 to 1, or about 6 to 1. Most preferably, the ratio of the largest to smallest objects that are fed into the density separators in the methods and systems described herein is about 4 to 1 (i.e., where the ratio of the top-cut to the bottom cut are in the foregoing ratios). In one embodiment, the methods and systems of the present invention are designed to provide waste materials to the density separators with particles size ratios within these approximate ranges.

Figure 7:
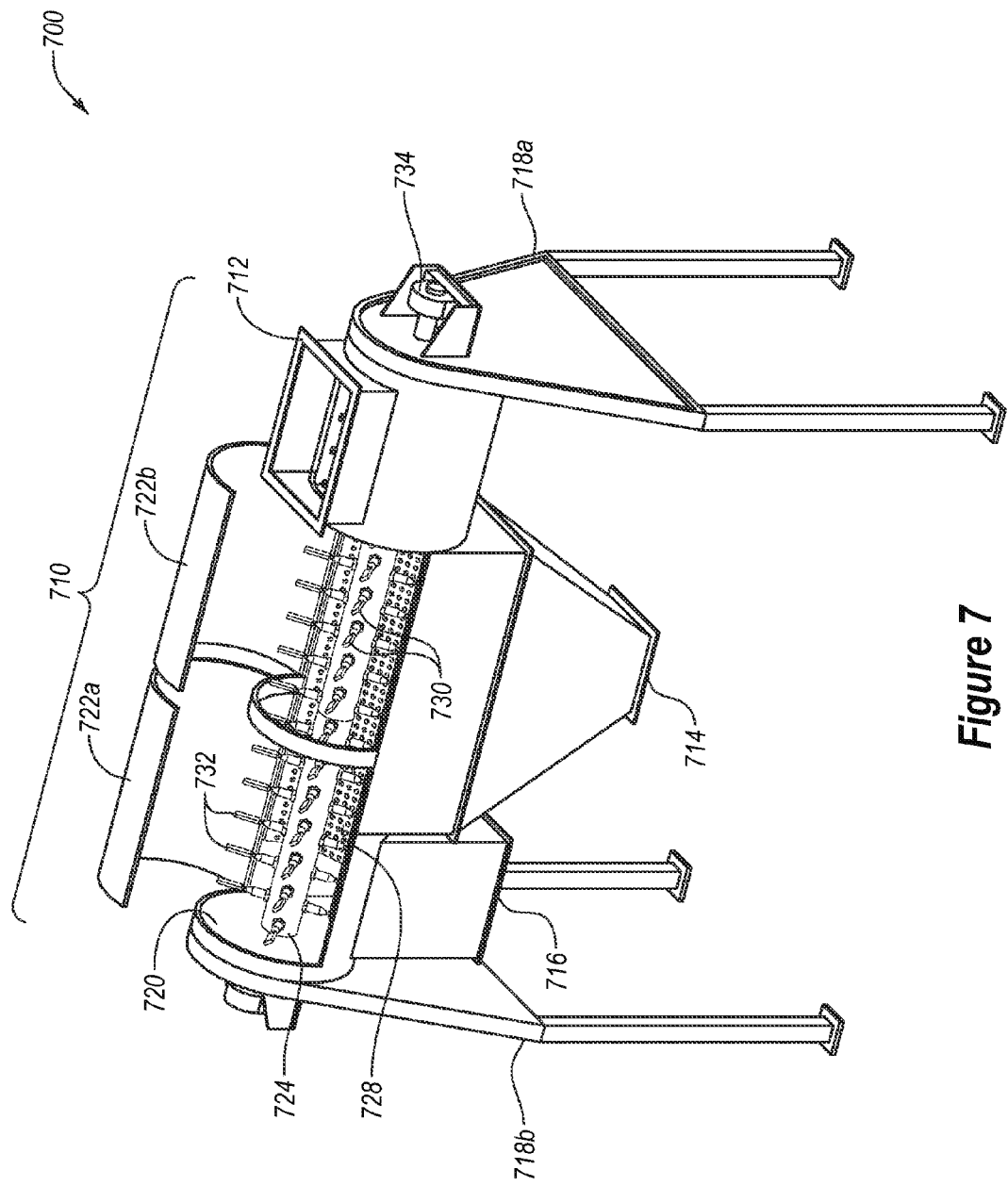
FIG. 7 illustrates a cut-away view of a hammer mill separator adapted for use in the system for separating solid waste, according to one embodiment of the present invention.

In yet another alternative embodiment, the fourth density separator 442 may be a hammer mill separator. The hammer mill separator may be used alone or in combination with an air separator. FIG. 7 illustrates an example hammer mill separator 700 that can be used with the present invention. Separator 700 includes a housing assembly 710. Housing assembly 710 can include an inlet 712 for feeding a waste stream into interior chamber 720 that houses rotating shaft 724. A motor and drive mechanism can be attached to end 734 of shaft 724 for rotating shaft 724 at a desired rotation speed.

Housing assembly 710 may also include outlet 714 for discharging a small particle sized heavy fraction and a second outlet 716 for discharging a large particle sized light fraction. Covers 722a and 722b can be hinge attached to other components of the housing assembly 710 to provide access to interior chamber 720 for cleaning and/or troubleshooting problems. Housing assembly 710 may also include stands 718a and 718b to lift chamber 720 off of a surface and provide access to outlets 714 and 716. However, a stand is not required and other configurations may also be used.

As mentioned, interior chamber 720 houses rotating shaft 724. Rotating shaft 724 includes a plurality of hammer shafts that extend generally perpendicular to the longitudinal axis of the rotating shaft 724. Rotating shaft 724 includes rows of beater blades 730 and breaker bars 732. Beater blades 730 include a flattened surface that produces an air flow in chamber 720 that moves parallel to the longitudinal axis of rotating shaft 724.

Breaker bars 732 are configured to hammer particles flowing in chamber 724 and fracture them to produce smaller sized particles. Breaker bars 732 have a paddle portion with the paddle angled perpendicular to the direction or rotation. In other embodiments, the breaker bars 732 can be a hexagonal shaft or other shaped shaft that creates little or no directional flow of air through chamber 720.

Hammer mill separator 700 separates particles based on the flowability of particles through chamber 720. Particles that are less susceptible to fracturing and more susceptible to the lifting action of the airflow in chamber 724 are forced toward exit 716. Particles that are more susceptible to comminution and less susceptible to being lifted by air flow are driven toward exit 714.

Interior chamber 720 optionally houses a screen 728 having a particular mesh size. Screen 728 can ensure uniformity in the cut off particle size and increase the duration that a particular sized particle remains in a path of the beater blades 730 and breaker bars 732. The screen mesh size can be selected to produce any of the distributions described herein.

While many of the methods and systems disclosed herein have been described as including density separation, those skilled in the art will recognize that in some embodiments, sufficient separation can be achieved without density separation, so long as the waste stream is comminuted and separated by size to produce intermediate streams enriched in at least one recoverable material.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for separating solid waste comprising:
   providing a mixed solid waste stream that includes wet organic waste, dry organic waste, and inorganic waste;
   shredding the mixed solid waste in a shredder to produce a comminuted waste having a first size distribution, wherein the shredder has cutting blades or knives configured to cut paper, plastic, rubber, wood, and/or textiles to a size and shape suitable for separation in an air density separator;
   fractionating the comminuted solid waste by size to produce an under fraction enriched in wet organic material and an over fraction enriched in dry organic material including at least two materials selected from the group consisting of paper, plastic, rubber, wood, and textiles; and
   fractionating the over fraction in a first density separator to produce a heavy fraction and a light fraction and separating the heavy fraction in a second density separator to produce a wet organic fraction and an inorganic fraction; and
   recovering one or more dry organic products from the light fraction or a downstream portion thereof, the dry organic products including a mixture of at least two materials selected from the group consisting of paper, plastic, rubber, wood, and textiles.

2. The method of claim 1, wherein the light fraction or a downstream portion thereof includes aluminum and the aluminum is separated from the stream in an eddy current separator.

3. The method of claim 2, further comprising recovering a metal product from the under fraction or a downstream portion thereof.

4. The method of claim 1, wherein the shredded waste is comminuted to a size of about 16 inches and below, and the over fraction has a second size distribution with a ratio of small particles to large particles of less than 1:8.

5. The method of claim 1, wherein the shredded waste is comminuted to a size of about 12 inches and below, and the over fraction has a second size distribution with a ratio of small particles to large particles of less than 1:6.

6. The method of claim 1, wherein the over fraction has a bottom cut size of greater than 4 inches.

7. The method of claim 1, wherein the under fraction is fractionated using a first density separation unit to produce a heavy fraction and a light fraction.

8. The method of claim 7, further comprising:
processing the under fraction using a second size separation unit situated downstream from the first size separation unit and upstream of the first density separation unit, wherein the second size separation unit is configured to produce a second over fraction having a second size distribution with a ratio of small particles to large particles of less than about 5 inches and a second under fraction having an upper particle size of less than about 1/5 of the large particle size of the over fraction and wherein the second under fraction comprises a wet organic product.

9. The method of claim 7, further comprising processing the light fraction from the first density separation unit using a second density separation unit to produce a dry organic product and a wet organic product.

10. The method of claim 9, wherein fractionating the over fraction using density separation is performed using a third density separation unit to produce the heavy fraction and the light fraction and wherein the heavy fraction from the third density separation unit is further separated by density using a fourth density separation unit to produce an inorganic fraction and a wet organic fraction.

11. The method of claim 10, further comprising:
using at least one of a magnetic separation unit or an eddy current separation unit to recover ferrous metal fraction or a non-ferrous metal fraction from the under fraction or a downstream portion thereof.

12. The method of claim 10, further comprising processing the wet organic product from the second size separation unit to remove at least a portion of a residual inorganic debris.

13. The method of claim 10, wherein the first and/or second density separation units includes an air drum separator and/or a gravity/air separation unit.

14. The method of claim 1, wherein the density separation of the over fraction is performed using an air drum separator.

15. The method of claim 1, wherein the wet organic fraction is processed to produce a wet organic product, the method further comprising processing the wet organic product using a microbial digestion system or drying the wet organic product to produce an organic fuel.

16. The method of claim 1, further comprising processing the dry organic product to produce a dry organic fuel.

17. A method as in claim 1, wherein the light fraction from the density separator has a density of less than 10 lbs/ft$^3$.

18. A system for separating solid waste, comprising:
a shredder configured to receive a mixed solid waste and comminute the mixed waste to produce a comminuted waste having a first size distribution, wherein the shredder has cutting blades or knives configured to cut paper, plastic, rubber, wood, and/or textiles to a size and shape suitable for separation in an air density separator;
at least a first size separation unit configured to receive comminuted waste from the comminuting device and fractionate the comminuted waste based on size to produce an under fraction and an over fraction, wherein the over fraction includes paper, plastic, rubber, wood, and/or textiles;
a first density separation unit configured to receive the over fraction and separate the over fraction based on density to produce light fraction and a heavy fraction;
a second density separation unit configured to receive the heavy fraction and produce a wet organic fraction and an inorganic fraction; and
one or more conveyors configured to recover a dry organic fuel from the light fraction or a downstream portion thereof, the dry organic fuel having at least two materials selected from the group consisting of paper, plastic, rubber, wood, and textiles.

19. The system recited in claim 18, wherein the shredder is configured to shred the solid waste to a size of about 16 inches and below.

20. The system recited in claim 18, wherein the over fraction from the first size separation unit has a second size distribution with a ratio of small particles to large particles of less than about 8 inches, and wherein the under fraction from the first size separation unit has as upper particle size of less than about 1/6 of the large particle size of the over fraction.

* * * * *